United States Patent
Kumar et al.

(10) Patent No.: US 10,402,335 B2
(45) Date of Patent: Sep. 3, 2019

(54) METHOD AND APPARATUS FOR PERSISTENTLY CACHING STORAGE DATA IN A PAGE CACHE

(71) Applicant: Intel Corporation, Santa Clara, CA (US)

(72) Inventors: Sanjay K. Kumar, Hillsboro, OR (US); Dheeraj R. Subbareddy, Portland, OR (US); Jeffrey R. Jackson, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 15/476,126

(22) Filed: Mar. 31, 2017

(65) Prior Publication Data

US 2018/0285276 A1 Oct. 4, 2018

(51) Int. Cl.
| | |
|---|---|
| *G06F 12/00* | (2006.01) |
| *G06F 12/0873* | (2016.01) |
| *G06F 16/172* | (2019.01) |
| *G06F 12/0866* | (2016.01) |
| *G06F 12/02* | (2006.01) |
| *G06F 12/0802* | (2016.01) |
| *G06F 12/0804* | (2016.01) |
| *G06F 12/0871* | (2016.01) |

(Continued)

(52) U.S. Cl.
CPC ...... *G06F 12/0873* (2013.01); *G06F 12/0238* (2013.01); *G06F 12/0802* (2013.01); *G06F 12/0804* (2013.01); *G06F 12/0866* (2013.01); *G06F 12/0871* (2013.01); *G06F 16/172* (2019.01); *G06F 21/55* (2013.01); *G06F 21/76* (2013.01); *G06F 2212/1041* (2013.01); *G06F 2212/225* (2013.01); *G06F 2212/283* (2013.01); *G06F 2212/608* (2013.01)

(58) Field of Classification Search
CPC ............. G06F 12/0238; G06F 12/0804; G06F 12/0866; G06F 12/0873; G06F 17/30132; G06F 2212/225; G06F 2212/1041; G06F 2212/283; G06F 2212/608

See application file for complete search history.

(56) References Cited

U.S. PATENT DOCUMENTS

| | | | | |
|---|---|---|---|---|
| 7,861,040 B2* | 12/2010 | Okuyama | ........... | G06F 12/0866 711/103 |
| 9,213,717 B1* | 12/2015 | Pawar | ................. | G06F 16/1774 |
| 2017/0046524 A1 | 2/2017 | Lee et al. | | |

FOREIGN PATENT DOCUMENTS

WO 2016122491 A1 8/2016

OTHER PUBLICATIONS

Lee, Eunji, et al., "Unioning of the Buffer Cache and Journaling Layers with Non-volatile Memory," 11th USENIX Conference on File and Storage Technologies (FAST '13), Feb. 2013, 8 pages.

(Continued)

*Primary Examiner* — Shawn X Gu
(74) *Attorney, Agent, or Firm* — Alliance IP, LLC

(57) ABSTRACT

In one embodiment, an apparatus comprises a memory to store executable instructions of an operating system and a processor to identify a request for data from an application; determine whether a persistent page cache stores a copy of the data, wherein the persistent page cache is directly addressable by the processor and is to cache data of a storage device that is not directly addressable by the processor; and access the data from the persistent page cache.

20 Claims, 6 Drawing Sheets

(51) Int. Cl.
G06F 21/55 (2013.01)
G06F 21/76 (2013.01)

(56) References Cited

OTHER PUBLICATIONS

Extended European Search Report for Application No. EP18160609.6, dated Aug. 28, 2016, 6 pages.
Ou J., et al., "A High Performance File System for Non-Volatile Main Memory," Proceedings of the Eleventh European Conference on Computer Systems, Jan. 2016, pp. 1-16.
Xiaojun C., et al., "A Novel Page Caching Policy for PCM and DRAM of Hybrid Memory Architecture," 2016 13th International Conference on Embedded Software and Systems (ICESS), Aug. 2016, pp. 67-73.

* cited by examiner

METHOD AND APPARATUS FOR PERSISTENTLY CACHING STORAGE DATA IN A PAGE CACHE

FIELD

The present disclosure relates in general to the field of computer development, and more specifically, to data caching.

BACKGROUND

A computer system may include one or more central processing units (CPUs) which may communicate with one or more storage devices. A CPU may include a processor to execute an operating system and/or other software applications that utilize a storage device coupled to the CPU. The software applications may write data to and read data from the storage device.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
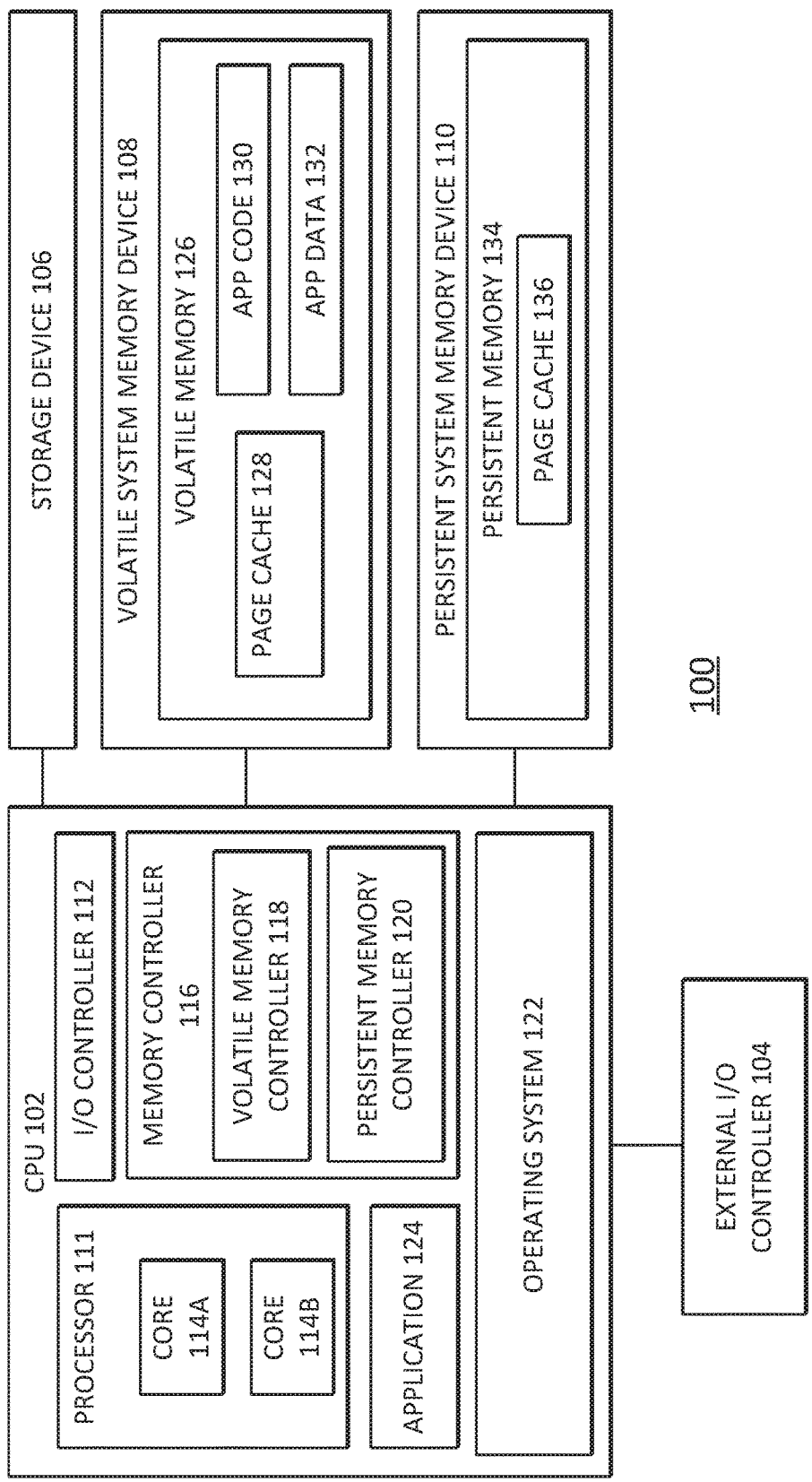
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104, a storage device 106, a volatile system memory device 108, and a persistent system memory device 110. During operation, data may be transferred between storage device 106 and CPU 102, between volatile system memory device 108 and CPU 102, between persistent system memory device 110 and CPU 102, or between any of storage device 106, volatile system memory device 108, and persistent system memory device 110. In various embodiments, particular data operations (e.g., read or write operations) involving a storage device 106, volatile system memory device 108, or persistent system memory device 110 may be issued by an operating system 122 and/or other logic (e.g., application 124) executed by processor 111.

Operating system based caching is a caching technique in which a host computing device (e.g., a CPU) executes logic that controls the caching of data stored on a storage device (e.g., a hard disk drive) to a smaller and faster cache storage device (e.g., a solid state drive (SSD)). When data that is not currently cached by the host is requested by an application executed by the host, the data may be retrieved from the storage device and stored in memory that may be accessed more easily by the host computing device (i.e., the data may be cached by the host). For example, data retrieved from the storage device (e.g., a hard disk drive (HDD)) may be cached by storing the retrieved data in a cache storage device (e.g., SSD), a system memory device, and/or one or more lower level caches of the CPU. After the data is cached, the data may be retrieved from one of the caches rather than the storage device, thus reducing the amount of latency for data accesses by the host.

In an operating system based caching system, an operating system may coordinate the caching of storage data from a storage device in a storage cache device comprising persistent (i.e., non-volatile) storage as well as a page cache in volatile system memory (e.g., dynamic random-access memory (DRAM)). A page cache (which is sometimes called a buffer cache or disk cache), is a cache for pages corresponding to data of a storage device, such as a HDD. An operating system may maintain a page cache in otherwise unused portions of the system memory (e.g., physical memory not directly allocated to applications may be used by the operating system for the page cache), resulting in quicker access to the contents of cached pages. A page cache is generally transparent to applications (i.e., applications are unaware as to whether the data retrieved is from a page cache or from the storage device).

In general, system memory may be CPU addressable (e.g., directly addressable by the processor) while the storage device is not. For example, a memory space may be directly addressable by a processor if the CPU can construct the physical address of data based on the address provided in an instruction executed by the processor. As an example, processor 111 of CPU 102 may directly address system memory by using load and store primitives (e.g., load and store instructions executed by cores 114A and 114B). In various embodiments, an address specified in the load and store primitives may be a physical address of the system memory or a virtual address that is translated to a physical address by CPU 102 (e.g., via a memory management unit of the CPU). In contrast, an external storage device (e.g., storage device 106 or a cache storage device) is not CPU addressable, as the CPU 102 must translate a memory address specified by an instruction (or a physical address corresponding to a virtual address specified by the processor) into a logical block address of the storage device 106 (the storage device 106 then translates this logical block address into a physical address of the requested data on the storage device 106). As another example, a memory space may be directly addressable by a processor if the memory space can provide the data to a location within the processor (e.g., in response to a load instruction by the processor). For example, a system memory may provide requested data to a register of the processor making it immediately available whereas a storage device must first copy the data to a system memory before the data is usable by the processor (which may require the processor to retry an instruction after the data has been brought into the system memory).

While storing the page cache in the system memory provides CPU addressability, caching in the storage cache device provides persistence (i.e., a power failure will not result in loss of the stored data). However, utilization of a volatile page cache and a storage cache device results in various drawbacks. Due to the volatility of the page cache, the operating system must typically populate the page cache upon every reboot of the computer system by copying data from the storage cache device to the volatile page cache. Additionally, the capacity of the volatile page cache is typically much smaller than the capacity of the cache storage device. This causes storage data to be evicted from the volatile page cache to the cache storage device and then repopulated back in the volatile page cache based on the application access pattern resulting in additional overhead. Additionally, because the page cache is volatile, data stored therein needs to be frequently flushed to the cache storage device to achieve persistence. This frequent flushing causes significant performance overhead especially for synchronous writes. Managing a page cache alongside other data stored in a volatile system memory also incurs relatively large costs, e.g., during the scanning of page lists when inactive pages are evicted to swap space. Additionally, caching storage data in a volatile page cache may consume precious volatile memory reducing the amount of volatile memory available to an operating system and applications for storing associated code and volatile data.

In various embodiments of the present disclosure, a computing system 100 comprises a page cache 136 stored in persistent memory 134 such as 3-dimensional (3D) crosspoint memory (or other persistent memory described herein). The persistent page cache 136 provides both CPU addressability and persistence for cached storage data (i.e., data that has a corresponding copy stored in storage device 106). Accordingly, cached data is available in the address space of CPU 102 even after a reboot of the computer system without having to move the data from the address space of storage device 106 after reboot. The need for frequent copying of storage data between a volatile system memory device and a non-volatile storage cache device is also reduced. Latency of I/O requests that hit in the persistent page cache (that would have missed in the volatile page cache) are reduced considerably. Persistence committing primitives (e.g., instructions requesting the movement of data from the page cache to persistent memory, such as calls to fsync and msync) result in minimal overhead because the associated data will already be stored in a persistent page cache (e.g., such instructions may merely include the updating of metadata to indicate that the data is stored in persistent memory). The usage of volatile memory is reduced, thus freeing up volatile memory for use by applications (operating systems typically use a portion of the volatile system memory for the page cache, while the rest of the memory may be used by applications). Additionally, the scanning of page lists to free volatile memory for applications may be accomplished much faster because the pages of the persistent page cache 136 do not need to be scanned. Finally, the persistent page cache 136 may enable efficient journaling for implementing transactions in file systems. By using the persistent page cache 136 as an implicit journal log, the need for a separate journal is eliminated. Typical file systems stage transactions in a DRAM-based page cache and then flush the transactions to persistence (i.e., to the cache storage device) on transaction commit. Since page cache 136 is persistent, a slightly modified logging protocol can be used to commit the transaction in the persistent page cache 136, without the need to flush data to a persistent storage device, resulting in improved transaction performance in file systems (or other storage management software such as object storage systems).

CPU 102 comprises a processor 111, such as a microprocessor, an embedded processor, a DSP, a network processor, a handheld processor, an application processor, a co-processor, an SOC, or other device to execute code (i.e., software instructions). Processor 111, in the depicted embodiment, includes two processing elements (cores 114A and 114B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 112 is an integrated I/O controller that includes logic for communicating data between CPU 102 and I/O devices, which may refer to any suitable logic capable of transferring data to and/or receiving data from an electronic system, such as CPU 102. For example, an I/O device may comprise a controller of an audio/video (A/V) device such as a graphics accelerator; a controller of a data storage device (e.g., storage device 106), such as an SSD, HDD, a Non-Volatile Dual In-line Memory Module (NVDIMM), or optical storage disk; a wireless transceiver; a network processor; a network interface controller; or a controller for another input device such as a monitor, printer, mouse, keyboard, or scanner; or other suitable device. In a particular embodiment, an I/O device may comprise a storage device controller (not shown) of storage device 106.

An I/O device may communicate with the I/O controller 112 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 112 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

Memory controller 116 is an integrated memory controller that includes logic to control the flow of data going to and from one or more system memory devices (sometimes referred to as main memory), such as volatile system memory device 108 or persistent system memory device 110. Memory controller 116 may include logic operable to read from a system memory device, write to a system memory device, or to request other operations from a system memory device. In various embodiments, memory controller 116 may receive write requests from cores 114 and/or I/O controller 112 (e.g., when a storage device 106 performs a direct memory access (DMA) operation) and may provide data specified in these requests to a system memory device for storage therein. Memory controller 116 may also read data from a system memory device and provide the read data to I/O controller 112 or a core 114. During operation, memory controller 116 may issue commands including one or more addresses of a system memory device in order to read data from or write data to memory (or to perform other operations). In some embodiments, memory controller 116 may be implemented on the same chip as CPU 102, whereas in other embodiments, memory controller 116 may be implemented on a different chip than that of CPU 102. I/O controller 112 may perform similar operations with respect to one or more storage devices 106.

Volatile memory controller 118 may communicate commands and data with volatile system memory device 108 and persistent memory controller 120 may communicate commands and data with persistent system memory device 110. In the embodiment depicted, volatile system memory device 108 and persistent system memory device 110 are shown as discrete devices, though in other embodiments, volatile memory 126 and persistent memory 134 may be integrated on the same device. Similarly, memory controller 116 is shown as including separate volatile and persistent memory controllers (118 and 120), though in other embodiments, a single memory controller may communicate with both volatile system memory device 108 and persistent system memory device 110 (or a single device that includes both volatile memory 126 and persistent memory 134). Memory controller 116 may be operable to determine, based on an address of a request, whether the request should be sent to volatile memory 126 or persistent memory 134 and may format the request accordingly.

The CPU 102 may also be coupled to one or more other I/O devices (such as any of those listed above or other suitable I/O devices) through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

Volatile system memory device 108 may store any suitable data, such as data used by processor 111 to provide the functionality of computer system 100. In the embodiment depicted, volatile memory 126 stores page cache 128, application code 130, and application data 132. In a particular embodiment, volatile memory 126 does not store a page cache 128 (instead the entire page cache is implemented in persistent memory 134). However, as explained in greater detail below, it may be advantageous in some situations to maintain a page cache 128 in volatile memory 126 for a portion of cached storage data as well as a page cache 136 in persistent memory 134 for cached storage data.

Page cache 128 or 136 may cache physical pages (sometimes referred to as frames) of storage data of a storage device 106. The page cache 128 may be maintained by the operating system 122 using volatile memory 126 that is also used by the applications executed by processor 111 (e.g., the page cache 128 may be implemented using memory that is left over after other portions of the volatile memory 126 is used for application code and data), while page cache 136 may, at least in some embodiments, be dedicated to the caching of storage data. Application code 130 may include executable instructions associated with the applications (e.g., a text segment). Application data 132 may include a stack segment storing a collection of frames that store function parameters, return addresses, local variables, or other data; a heap segment that is used when an application allocates memory dynamically at run time, a data segment that includes static variables and initialized global variables; a segment that stores uninitialized global and static variables; and/or any other suitable data associated with one or more applications 124 executed through the operating system 122.

In a particular embodiment, page cache 128 or 136 may cache file data using radix-tree structure. Each file (which may, e.g., be identified by an inode in a Linux based operating system) having data stored in the page cache may be represented by a radix tree. A radix-tree maps file offsets (which are represented using leaf nodes of the radix-tree) to data pages of the page cache. When pages are cached in the page cache, file data is read from storage device 106 and stored into the radix-tree leaf nodes. Dirty data (data that has been modified by processor 111 and not yet written back to storage device 106) in a radix-tree is either synchronously (e.g., using the fsync operation) or asynchronously (e.g., using periodic writeback) written to the storage device 106.

In various embodiments, the operating system 122 may maintain a page table for each active application, which stores information used to determine a physical memory page residing in a system memory device based on a virtual address (e.g., of an instruction executed by a core 114). In some embodiments, the page tables may be stored in either volatile memory devices or persistent memory devices and individual virtual page addresses may map to physical page addresses in either volatile memory devices or persistent memory devices.

A system memory device (e.g., volatile system memory device 108 and/or persistent system memory device 110) may be dedicated to a particular CPU 102 or shared with other devices (e.g., one or more other processors or other device) of computer system 100. In various embodiments, a system memory device may be checked to see whether it stores requested data after a determination is made that last level cache of CPU 102 does not include requested data.

In various embodiments, a system memory device may include a memory comprising any number of memory modules, a memory device controller, and other supporting logic (not shown). A memory module may include persistent memory and/or volatile memory. Volatile system memory device 108 includes volatile memory 126 and persistent system memory device 110 includes persistent memory 134, though either system memory device may include volatile memory and persistent memory in some embodiments.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of memory 108 that is volatile memory can comply with JEDEC standards including but not limited to Double Data Rate (DDR) standards, e.g., DDR3, 4, and 5, or Low Power DDR4 (LPDDR4) as well as emerging standards.

Persistent memory is a storage medium that does not require power to maintain the state of data stored by the medium. In various embodiments, persistent memory may be byte or block addressable. Nonlimiting examples of persistent memory may include any or a combination of: solid state memory (such as planar or 3D NAND flash memory or NOR flash memory), 3D crosspoint memory, memory that uses chalcogenide phase change material (e.g., chalcogenide glass), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM).

A storage device 106 may store any suitable data, such as data used by processor 111 to provide functionality of computer system 100. For example, data associated with programs that are executed or files accessed by cores 114A and 114B may be stored in storage device 106. In various embodiments, a storage device 106 may store persistent data (e.g., a user's files or software application code) that maintains its state even after power to storage device 106 is removed. A storage device 106 may be dedicated to CPU 102 or shared with other devices (e.g., another CPU or other device) of computer system 100.

In various embodiments, storage device 106 may comprise a solid state drive; a hard disk drive; a memory card; a NVDIMM; a tape drive; or other suitable mass storage device. In particular embodiments, storage device 106 is a block based storage device that stores data blocks addressable by a host computing device (e.g., CPU 102) by logical block addresses (LBAs).

Storage device 106 may include any suitable interface to communicate with I/O controller 112 or external I/O controller 104 using any suitable communication protocol such as a DDR-based protocol, PCI, PCIe, USB, SAS, SATA, FC, System Management Bus (SMBus), or other suitable protocol. A storage device 106 may also include a communication interface to communicate with I/O controller 112 or external I/O controller 104 in accordance with any suitable logical device interface specification such as NVMe, AHCI, or other suitable specification.

In various embodiments, the storage device 106 also includes an address translation engine that includes logic (e.g., one or more logic-to-physical (L2P) address tables) to store and update a mapping between a logical address space (e.g., an address space visible to a computing host coupled to the storage device 106) and the physical address space of the storage media of the storage device 106 (which may or may not be exposed to the computing host). The logical address space may expose a plurality of logical groups of data which are physically stored on corresponding physical groups of memory addressable, by the storage device 106, through the physical address space of the storage device 106. Thus, the L2P address table may translate between an LBA provided by a host and a physical address of corresponding data. In a particular embodiment, an LBA specifies the minimum amount of data that may be referenced using a write or read command (which may sometimes be referred to as a page). In various example, an LBA may refer to a block size of 512 bytes, 1 Kilobyte (KB), 2 KB, 4 KB, or other suitable block size.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of system 100, such as cores 114, memory controller 116, I/O controller 112, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
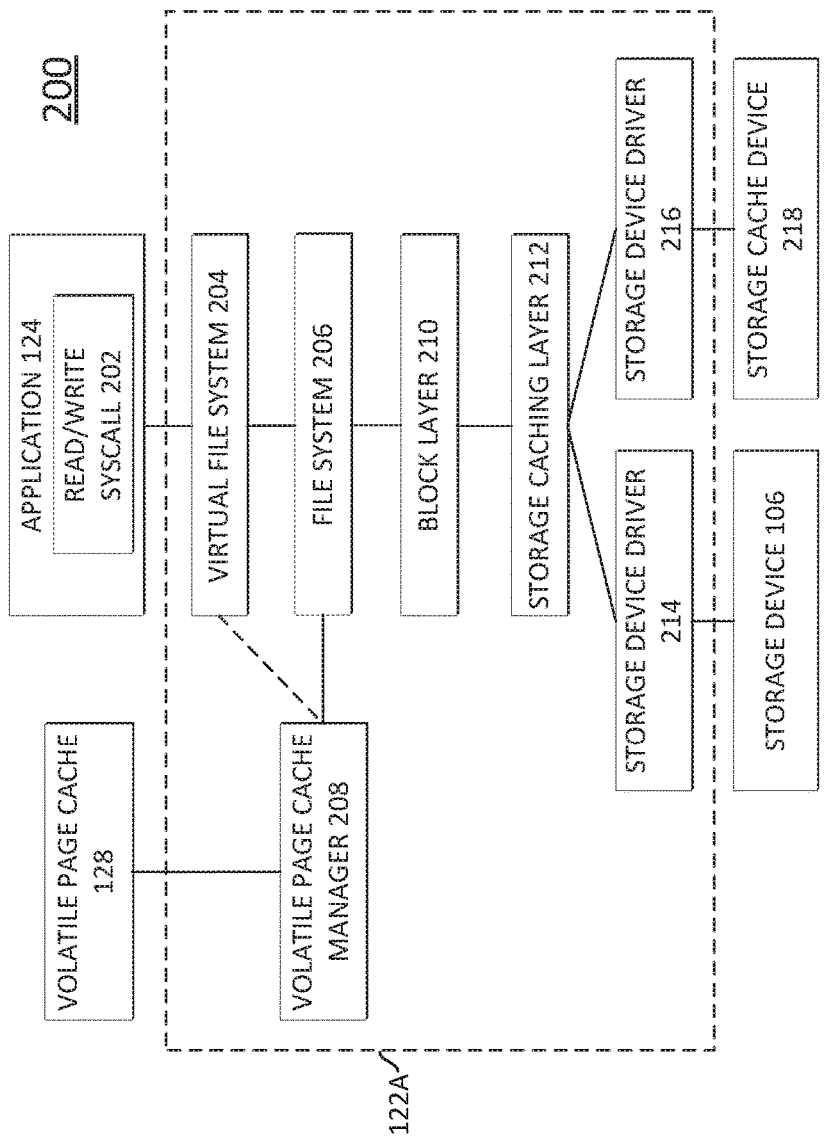
FIG. 2 illustrates a block diagram of components of a computer system implementing operating system based caching in accordance with certain embodiments.

FIG. 2 illustrates a block diagram of components of a computer system 200 implementing operating system based caching in accordance with certain embodiments. System 200 may include any of the components of system 100. Various components of system 200 (e.g., virtual file system 204, file system 206, volatile page cache manager 208, block layer 210, storage caching layer 212, and storage device drivers 214 and 216) may comprise logic (e.g., software modules) implemented by operating system 122A, which may have any suitable characteristics of operating system 122.

In the embodiment depicted, application 124 issues a read or write system call 202. The system call may specify any suitable information identifying data, such as a file descriptor identifying the file to be accessed (in some situations this may include a path and/or a name of a file), an amount (e.g., number of bytes) to read or write, an offset into the file (e.g., in terms of bytes from the start of the file), a buffer in which the read data is to be placed or in which the write data is stored, or other suitable data associated with the data to be read or written.

The system call 202 is received by virtual file system 204. The virtual file system 204 may be an abstraction of file system 206, such that applications may generate system calls without having to format the requests in accordance with any of a number of file systems that may be implemented by an operating system. If multiple file systems are implemented by operating system 122A, the virtual file system 204 may determine the appropriate file system 206 to which the system call should be sent. The virtual file system 204 may format the system call in a manner that is compatible with the particular file system 206 to which the system call is sent.

File system 206 may represent any suitable file system, such as a File Allocation Table (FAT), New Technology File System (NTFS), Resilient File System (ReFS), HFS+, a native Linux file system, ISOFS, or other suitable file system. In general, a file system makes stored data visible to an application or user (e.g., by organizing storage in a hierarchical namespace). A file system may manage access to both the content of files and metadata about those files.

The file system 206 may call a page cache application program interface (API) based on the received system call. In other embodiments, the virtual file system may directly call a page cache API based on the received system call (such a call is indicated by the dotted line between the virtual file system 204 and the volatile page cache managers 208 and 308 in FIGS. 2 and 3). The API call may include any of the information described above as being included in the system call or information derived therefrom. In one embodiment, the API call includes a file identifier (such as an inode as used in Linux operating systems or other similar identifier), a file offset, and a number of bytes. The API call is sent to the volatile page cache manager 208, which determines whether the requested data is stored in volatile page cache 128. Volatile page cache manager 208 may maintain a record of the data stored within volatile page cache 128 and the status of such data.

In the case of a read system call, if the requested data is stored in volatile page cache 128, then the data is provided to the requesting application (e.g., the volatile page cache manager 208 may send a request for the data to the volatile system memory device 108 through the volatile memory controller 118. If the requested data is not in the volatile page cache 128, the volatile page cache manager 208 notifies the file system 206 of such. The file system then determines one or more LBAs that correspond to the data specified in the system call 202. For example, the file system 206 may map the file descriptor and offset to an LBA.

The LBA(s) are passed to the block layer 210. In a particular embodiment, the LBA(s) determined by file system 206 may be relative LBAs (e.g., the file system 206 may not be aware of one or more other partitions on storage device 106 and thus the determined LBA(s) may be specific to a partition associated with the file system). The block layer 210 has knowledge of the other partitions on storage device 106 and may translate the determined LBA(s) into absolute LBA(s). In some embodiments, the block layer 210 may submit a request with the absolute LBA(s) to an I/O scheduler, which aggregates similar requests before sending an aggregated request to the storage caching layer 212. The storage caching layer 212 determines whether the storage cache device 218 (e.g., an SSD or other storage device that is faster than the storage device 106) has cached data corresponding to the determined LBA(s). If the storage cache device 218 is currently caching the data, the storage caching layer 212 may send a request to the storage device driver 216 to retrieve the data and the storage device driver 216 may send a request to the storage cache device 218 for the data (e.g., via a controller, such as I/O controller 112). If the storage cache device 218 does not have the data cached, the storage caching layer 212 sends a request for the data stored at the determined LBA(s) to the storage device driver 214 which then requests the data from storage device 106 (e.g., via I/O controller 112). The data is then cached in the storage cache device. In either case, the data may be sent to the volatile page cache 128 for storage therein (e.g., via a direct memory access (DMA) operation), so that the processor 111 may access the data from the volatile page cache 128.

In the case of a write system call, corresponding (though not identical) operations may be performed and the data may be written to any one or more of the volatile page cache 128, storage cache device 218, and/or storage device 106 as a result of the system call 202. In a particular embodiment, a write system call writes the data to the volatile page cache 128 or the persistent page cache 136 and the operating system asynchronously flushes the dirty page cache pages to the storage device 106. Thus, completion of a write system call itself doesn't necessarily guarantee the data is persistent (indeed the data is not persistent if it is only stored in the volatile page cache 128). In order to ensure persistence, the application may issue an additional system call (e.g., fsync or msync) to instruct the operating system to synchronously flush the dirty pages from the page cache to the storage device 106. When the data is written to the volatile page cache 128, this includes flushing the data to the storage device 106. When the data is written to the persistent page cache 136, such system calls may merely involve flushing the data from one or more CPU caches (e.g., L1 cache, L2 cache, LLC, etc.) followed by updating metadata to reflect that the data is persistent and do not necessarily cause the data to be synchronously flushed to the storage device 106 (though in particular embodiments, such data could be flushed to the storage device 106 in response to these system calls).

Figure 3:
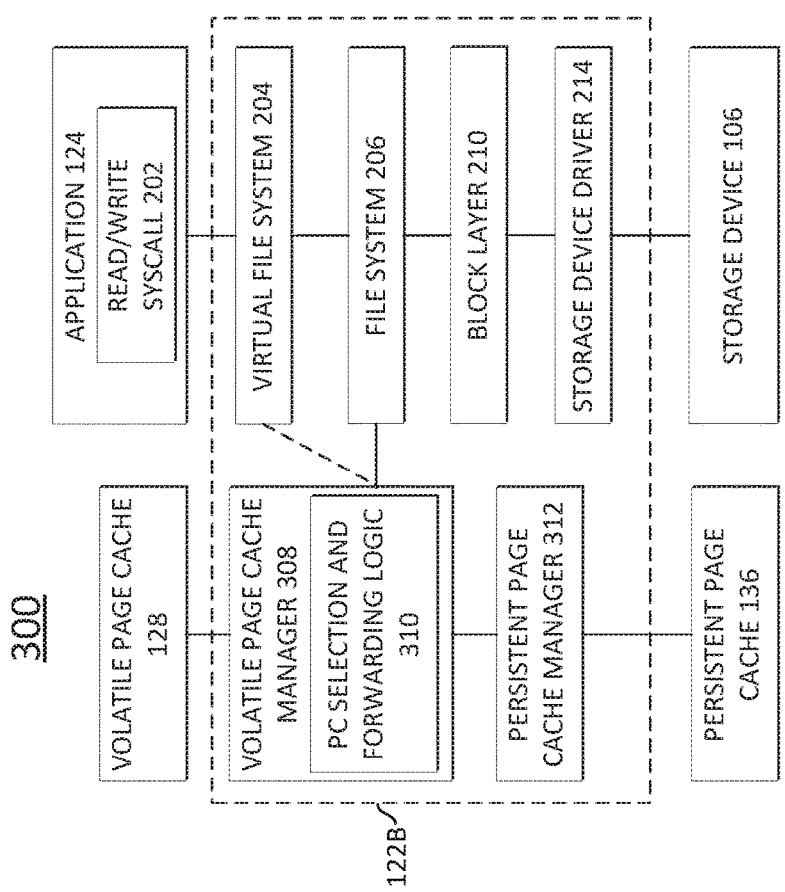
FIG. 3 illustrates a block diagram of components of a computer system implementing a persistent page cache in accordance with certain embodiments.

FIG. 3 illustrates a block diagram of components of a computer system 300 implementing a persistent page cache 136 in accordance with certain embodiments. System 300 may include any of the components of system 100 or 200. Various components of system 300 are implemented by operating system 122B (including volatile page cache manager 308 and persistent page cache manager 312), which may have any suitable characteristics of the other operating systems described herein.

In the embodiment depicted, the storage cache device 218 has been omitted, as the persistent page cache 136 may provide persistent storage of cached data that is also directly addressable by the processor 111. As in the system of FIG. 2, a read or write system call 202 may result in the file system 206 sending a page cache API call to the volatile page cache manager 308 (which may include any of the characteristics of volatile page cache manager 208). However, volatile page cache manager 308 includes page cache selection and forwarding logic 310, which is operable to determine whether the API call represents a request for the volatile page cache 128 or the persistent page cache 136. If the request is for the volatile page cache 128, then the volatile page cache manager 308 services the request (e.g., by determining whether the requested data is stored by volatile page cache 128 and either requesting the data from volatile page cache 128 or providing an indication to file system 206 that the data is not stored in the volatile page cache 128). If the request is for the persistent page cache 136, then logic 310 forwards the request to the persistent page cache manager 312. Persistent page cache manager 312 may perform functions similar to a volatile page cache manager, but with respect to the persistent page cache 136. The persistent page cache manager 312 may service the received request (e.g., by determining whether the requested data is stored by persistent page cache 136 and either requesting the data from persistent page cache 136 or providing an indication to the file system 206, e.g., via logic 310, that the data is not stored in the persistent page cache 136).

If the data is not stored by the selected page cache, the data is requested from storage device 106 (in a manner similar to that describe above in connection with FIG. 2). The requested data is then written to the selected page cache, where the processor 111 can access it (e.g., via a load instruction) and provide the requested data to application 124.

In particular embodiments, persistent page cache 136 may include persistent versions of volatile page cache 128's core data structures. As just one example, persistent page cache 136 may include a persistent radix tree. In a particular embodiment, a slab allocator (which operating system 122 may use to manage volatile memory) manages the volatile page cache 128, but does not manage the persistent page cache 136. In another embodiment, a single allocator may manage both the volatile page cache 128 and the persistent page cache 136.

Since almost all existing file systems utilize page caching, these file systems may be compatible with system 300 with little to no changes to the file systems, though changes may be made to the operating system memory management system to accommodate the address space of the additional page cache (i.e., persistent page cache 136). For example, the operating system 122B may manage a table of file mappings that includes a bit for each file mapping that indicates whether the corresponding file is to be cached in the volatile page cache 128 or the persistent page cache 136. Logic 310 (or other selection logic described below) may access the appropriate entry to determine the value of this bit when determining whether the API call should be forwarded to persistent page cache manager 312 or serviced by volatile page cache manager 308.

Because, in some embodiments, the performance of persistent memory 134 may be lower than the performance of volatile memory 126 (e.g., DRAM), it may be advantageous to cache some files in the volatile page cache 128 and other files in the persistent page cache 136. Operating system 122 (or any of the variants thereof described herein) can support selective caching of files in the volatile page cache 128 or persistent page cache 136. In one example, the decision of whether to cache in the persistent page cache 136 may be based on a hint from an application (e.g., a flag received in a system call such as file open( ) or fadvise( )). In another example, the OS 122 can make the determination based on heuristics. For example, files opened for writing or boot-time files may be cached in the persistent page cache 136. As another example, the OS 122 can initially cache a file in the persistent page cache 136 and track the cache hit rate of the file. If the hit rate increases beyond a certain threshold, the file can additionally or alternatively be cached in volatile page cache 128 to improve access time. In other embodiments, instead of selecting the page cache on a per-file basis, an entire file system may be designated for caching in the persistent page cache 136. For example, when a disk or a partition of a disk is mounted with a persistent cache option, all the addresses mappings of the file structures read from that disk may be marked with a persistent flag, causing the files (when cached) to be cached in persistent page cache 136.

Figure 4:
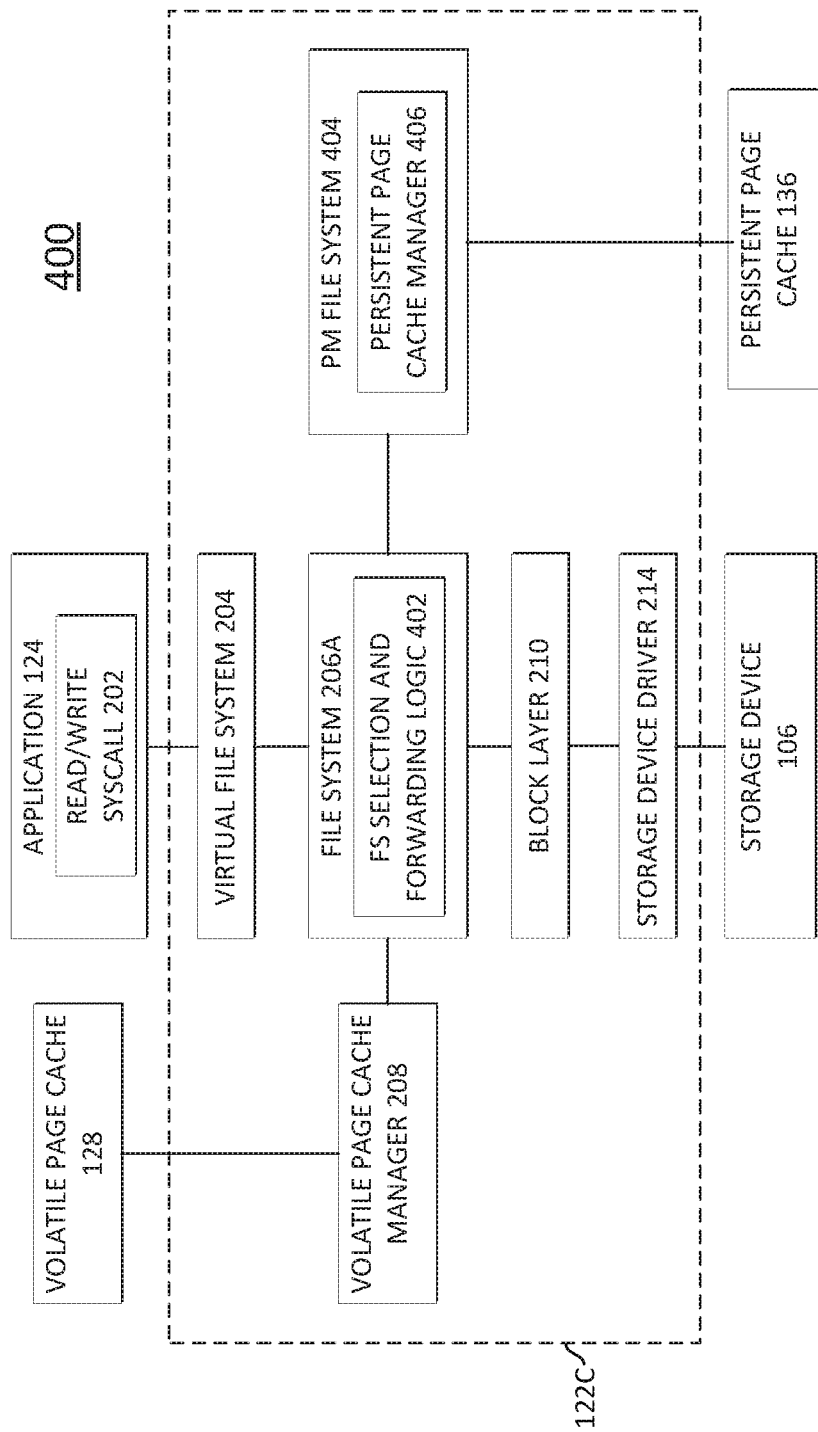
FIG. 4 illustrates a block diagram of components of a computer system implementing a persistent memory file system and a persistent page cache in accordance with certain embodiments.

FIG. 4 illustrates a block diagram of components of a computer system 400 implementing a persistent memory file system 404 and a persistent page cache 136 in accordance with certain embodiments. FIG. 4 illustrates a block diagram of components of a computer system implementing a persistent page cache in accordance with certain embodiments. System 400 may include any of the components of system 100 or other systems described herein. Various components of system 400 are implemented by operating system 122C (including persistent memory file system 404), which may have any suitable characteristics of any of the operating systems described herein.

As in the system of FIG. 2, a read or write system call may result in system call being passed to a file system 206A. The file system may have any suitable characteristics of file system 206. The file system 206A may additionally include file system selection and forwarding logic 402 which is operable to determine whether the system call represents a request for the volatile page cache 128 or the persistent page cache 136. If the request is for the volatile page cache 128, then logic 402 allows the request to be serviced by file system 206A (e.g., in a manner similar to that described above). If the request is for the persistent page cache 136, then logic 402 may make an API call to persistent memory file system 404. The API call may include any suitable parameters from the system call 202 or other parameters derived therefrom. In a particular embodiment, the API call is a file system-cache API call, as used in Linux based operating systems or similar API call.

Persistent memory file system 404 is any suitable persistent memory aware file system, such as a file system that implements the functionality of a Persistent Memory File System (PMFS), a Linux based DAX-EXT4 or DAX-XFS file system, a Windows based DAS or DAX mode NTFS, or other suitable file system. A traditional file system is configured to check a page table before accessing storage. In various embodiments, a persistent memory aware file system is configured to perform reads and writes directly to a storage device (i.e., without first checking for a copy of the data in a page cache). Thus, PM file system 404 may be configured to create a persistent page cache 136 that is accessed directly upon a data access request (without a first check to a traditional page cache, such as volatile page cache 128). In a particular embodiment, persistent memory file system 404 is configured to send requests to persistent page cache 136, but not volatile page cache 128.

When PM file system 404 receives the API call, persistent page cache manager 406 may service the request (e.g., by determining whether the requested data is stored by persistent page cache 136 and either requesting the data from persistent page cache 136 or providing an indication to the file system 206A, e.g., via logic 402, that the data is not stored in the persistent page cache 136).

When the file system 206A receives a system call representing a request for volatile page cache 128, an API call may be made to volatile page cache manager 208 by the file system 206A and the volatile page cache manager 208 may service the request (e.g., by determining whether the requested data is stored by volatile page cache 128 and either requesting the data from volatile page cache 128 or providing an indication to file system 206A that the data is not stored in the volatile page cache 128). In various embodiments, an operating system may cache storage data in both volatile page cache 128 and persistent page cache 136. In a particular embodiment, upon a determination that volatile page cache 128 does not include the data of the request, a file system (e.g., any of the file systems described herein) may make an API call to the persistent page cache manager to determine whether the persistent page cache 136 includes the data.

Regardless of the page cache that was checked, when file system 206A receives an indication that the data was not stored in the selected page cache (or in some embodiments that the data was not stored in either page cache), it may request the data from storage device 106 and the data may then be stored to the selected page cache for retrieval by processor 111.

In system 400, the PM file system 404 is effectively used as a cache for the file system 206A. Thus, the file system 206A is modified to use the PM file system 404 as a page cache (in place of volatile page cache 128) for some data. When a PM file system 404 attempts to access data, it may avoid the volatile page cache 128 and attempt to access the data in the persistent page cache 136. In various embodiments, the application is unaware of PM file system 404 and is under the assumption that file system 206A handles all of the read and write system calls. The PM file system 404 may access the persistent page cache 136 directly (e.g., without going through a device driver and a block layer).

Figure 5:
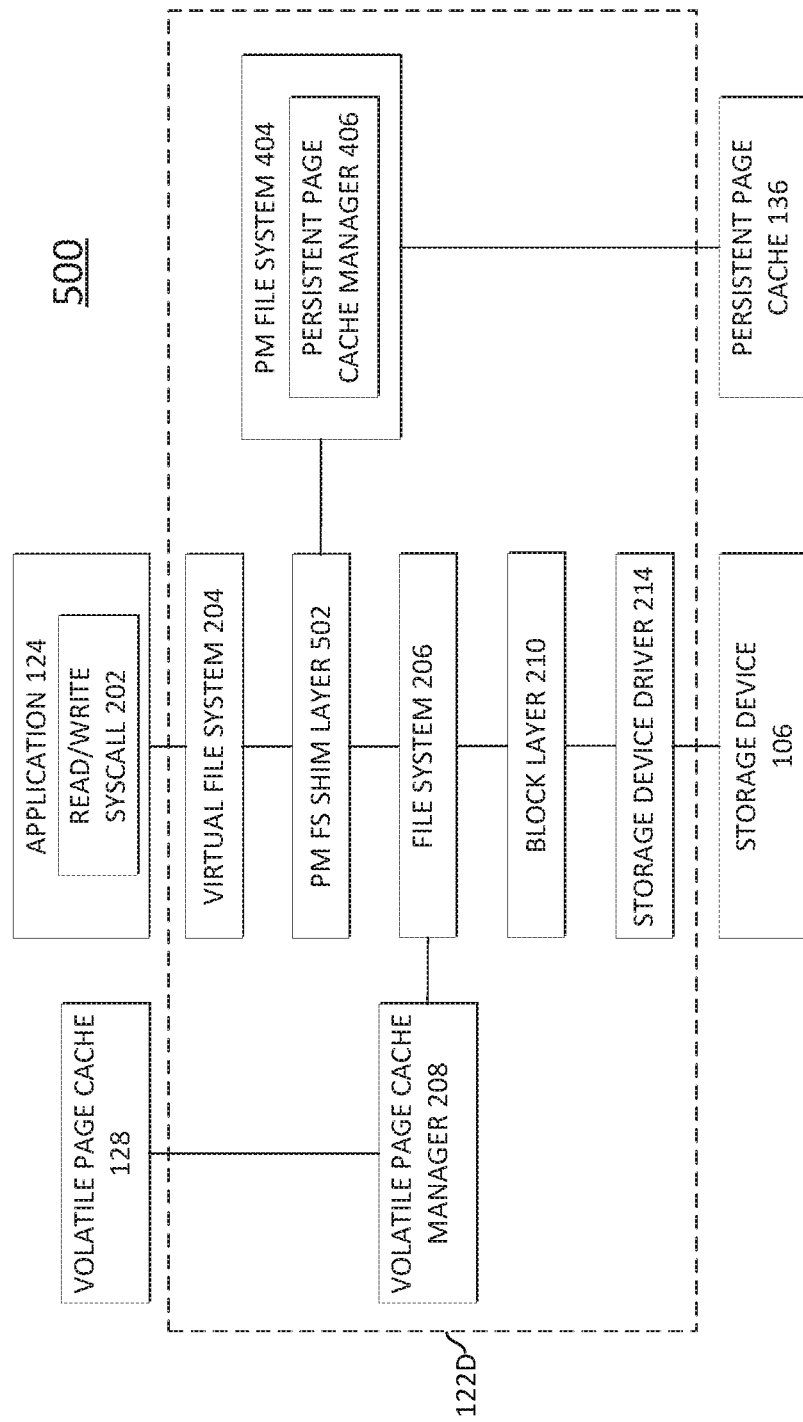
FIG. 5 illustrates a block diagram of components of a computer system implementing a persistent memory file system shim layer and a persistent page cache in accordance with certain embodiments.

FIG. 5 illustrates a block diagram of components of a computer system 500 implementing a persistent memory file system shim layer 502 and a persistent page cache 136 in accordance with certain embodiments. System 500 may include any of the components of system 100 or other systems described herein. Various components of system 500 are implemented by operating system 122D (including persistent memory file system shim layer 502), which may have any suitable characteristics of any of the operating systems described herein.

The shim layer 502 intercepts requests sent to the file system 206 (e.g., by the application 124 and/or virtual file system 204). Shim layer 502 determines whether the requests are related to files that are to be cached in the persistent page cache 136 or the volatile page cache 128. If the request relates to a file that is marked for caching by the volatile page cache 128, the request is allowed to pass through the shim layer 502 to the file system 206, where it is processed in a manner similar to that described above. If the request relates to a file that is marked for caching by the persistent page cache 136, the shim layer 502 redirects the request to the PM file system 404. In some embodiments, the shim layer 502 may also reformat the request into a format that is compatible with PM file system 404. The request is then serviced by persistent page cache manager 406 in a manner similar to that described above. If the persistent page cache 136 does not include the requested data, the shim layer 502 is notified by the PM file system 404 and a request is made through file system 206 for the data to be copied from storage device 106 to the persistent page cache 136. The request from the shim layer may also indicate to the file system to not check in the volatile page cache (e.g., using DIRECT I/O) before accessing the storage device 106.

In a particular embodiment, instead of determining between passing an intercepted system call to the file system 206 or redirecting the call (e.g., via an API call) to the PM file system 404, the shim layer 502 may make API calls to the PM file system 404 by default. If the persistent page cache manager 406 determines the data is not in the persistent page cache 136, the shim layer 502 may be notified and the shim layer may then pass the system call to the file system 206 for processing. This effectively enables the shim layer to present a new persistent memory file system of size equal to storage device 106 to the operating system and applications by caching data in the persistent memory file system 404.

In a particular embodiment, a filter driver of operating system 122D (e.g., some Windows based operating systems provide filter drivers that may run on top of a file system) may be used to implement at least a part of shim layer 502. Thus, in one example, a filter driver may run on top of an NTFS without requiring any significant modifications to the NTFS to implement system 500.

Figure 6:
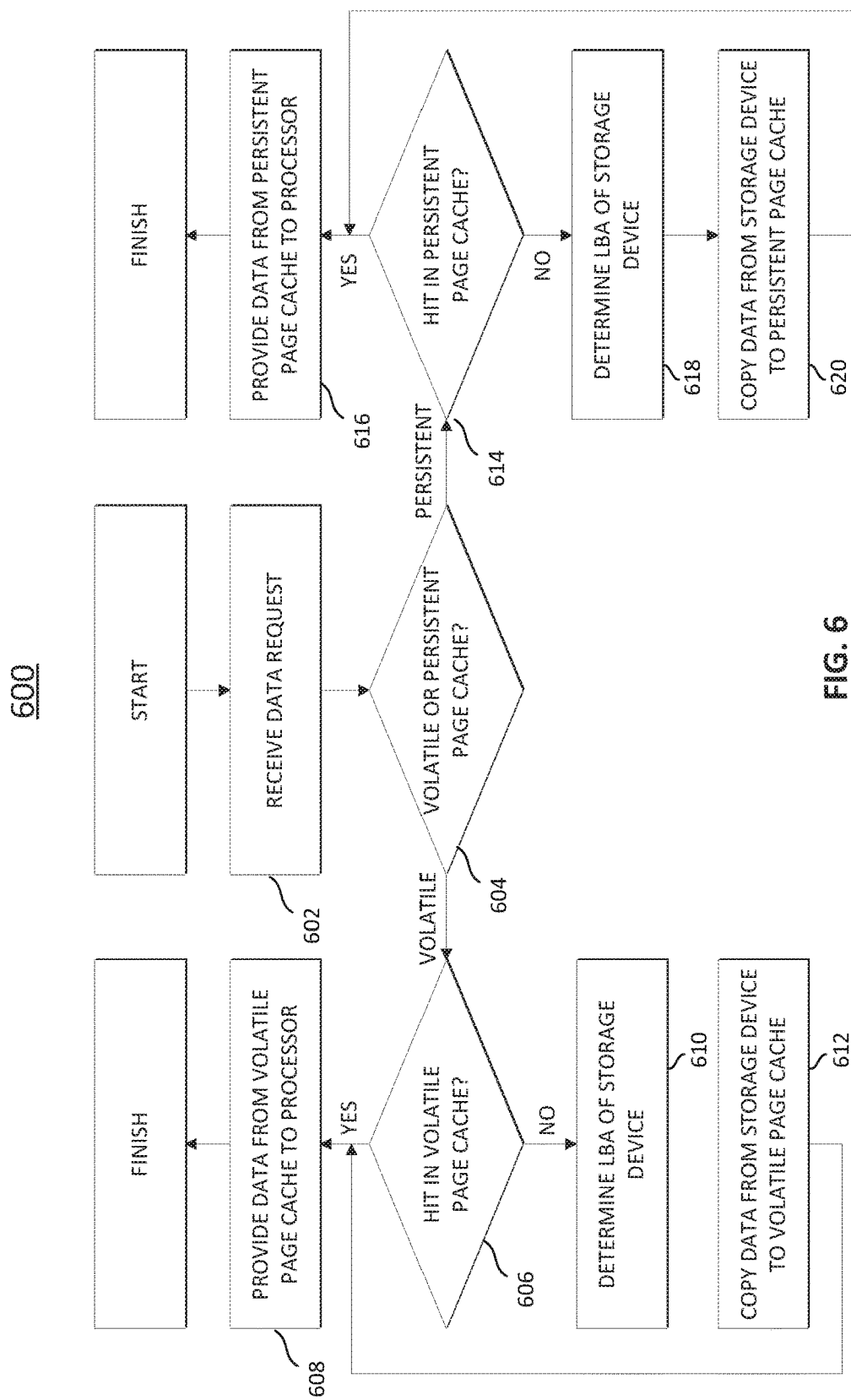
FIG. 6 illustrates an example flow for providing data to a processor from a page cache in accordance with certain embodiments.

FIG. 6 illustrates an example flow 600 for providing data to a processor 111 from a page cache in accordance with certain embodiments. Various operations of flow 600 may be performed by any suitable logic of system 100, such as CPU 102, volatile page cache 128, persistent page cache 136, or storage device 106.

At 602, a data request is received, e.g., from an application executed by processor 111. At 604, a determination is made as to whether the data is associated with volatile page cache 128 or persistent page cache 136. As one example, a table that maps files to the page caches may be accessed to determine which page cache is assigned to cache data of a file referenced by the data request.

If the volatile page cache is associated with the data, a determination is made as to whether the volatile page cache stores the requested data at 606. If the volatile page cache stores the data, then the data is provided from the volatile page cache to the processor at 608. The data may be provided in any suitable manner. As just one example, the data may be placed on a bus by volatile system memory device 108 and copied into a register of the processor 111. If the data is not in the volatile page cache, an LBA corresponding to the data is determined at 610 (e.g., based on a file descriptor and offset of the data request) and a request with the LBA is sent to the storage device. The requested data is copied from the storage device to the volatile page cache at 612 and then provided to the processor at 608.

If the persistent page cache is associated with the data, a determination is made as to whether the persistent page cache stores the requested data at 614. If the persistent page cache stores the data, then the data is provided from the persistent page cache to the processor at 616. The data may be provided in any suitable manner. As just one example, the data may be placed on a bus by persistent system memory device 110 and copied into a register of the processor 111. If the data is not in the persistent page cache, an LBA corresponding to the data is determined at 618 (e.g., based on a file descriptor and offset of the data request) and a request with the LBA is sent to the storage device. The requested data is copied from the storage device to the persistent page cache at 620 and then provided to the processor at 616.

The flow described in FIG. 6 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 6 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible)

by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the flows (e.g., flow 600) or functionality of any of the various components of systems depicted throughout the figures, such as CPU 102, external I/O controller 104, storage device 106, system memory devices 108 and 110, other components described herein, or subcomponents thereof. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, an apparatus comprises a memory to store executable instructions of an operating system; and a processor to identify a request for data from an application; determine whether a persistent page cache stores a copy of the data, wherein the persistent page cache is directly addressable by the processor and is to cache data of a storage device that is not directly addressable by the processor; and access the data from the persistent page cache.

In an embodiment, the processor is to identify a request for second data from a second application; determine, whether a volatile page cache stores a copy of the data, wherein the volatile page cache is directly addressable by the processor and is to cache data of the storage device; and access the data from the volatile page cache. In an embodiment, the processor is to implement a volatile page cache manager that is to determine that a file that includes the data is marked for caching in the persistent page cache; and send a request for the data to a persistent page cache manager. In an embodiment, the processor is to implement a first file system of the operating system, wherein the first file system is to determine whether a file that includes the data is marked for caching in the persistent page cache or volatile page cache; and in response to determining that the file is marked for caching in the persistent page cache, send a request for the data to a second file system. In an embodiment, the processor is to implement a first file system that is to send data requests towards the volatile page cache; implement a second file system that is to send data requests towards the persistent page cache; and implement a shim layer that is to intercept a data request sent to the first file system and communicate the data request to the second file system. In an embodiment, the request for data comprises a file descriptor. In an embodiment, the processor is to send a request to the storage device to copy the data to the persistent page cache upon a determination that the persistent page cache does not store a copy of the data. In an embodiment, the processor is to translate a file descriptor and offset of the request for data into a logical block address and send the logical block address to the storage device in the request to the storage device. In an embodiment, the volatile page cache is to be stored in a volatile memory that is further to store application code and application data. In an embodiment, the persistent page cache is to be stored in 3D crosspoint memory. In an embodiment, the processor is to determine whether to cache data in the volatile page cache or the persistent page cache based on at least one of a hint from an application that issues a system call referencing the data; whether the data is opened for writing; whether the data is required for booting; or whether the data is file data or metadata. In an embodiment, the processor is to, upon receiving a request to sync dirty data of the persistent page cache, update metadata in the persistent page cache to mark the dirty data as persistent.

In at least one embodiment, a method comprises identifying a request for data from an application; determining whether a persistent page cache stores a copy of the data, wherein the persistent page cache is directly addressable by a processor and is to cache data of a storage device that is not directly addressable by the processor; and accessing the data from the persistent page cache.

In an embodiment, the method further comprises identifying a request for second data from a second application; determining, whether a volatile page cache stores a copy of the data, wherein the volatile page cache is directly addressable by the processor and is to cache data of the storage device; and accessing the data from the volatile page cache. In an embodiment, the method further comprises implementing a volatile page cache manager that is to determine that a file that includes the data is marked for caching in the persistent page cache; and sending a request for the data to a persistent page cache manager. In an embodiment, the method further comprises implementing a first file system of an operating system, wherein the first file system is to determine whether a file that includes the data is marked for caching in the persistent page cache or volatile page cache; and in response to determining that the file is marked for caching in the persistent page cache, send a request for the data to a second file system. In an embodiment, the method further comprises implementing a first file system that is to send data requests towards the volatile page cache; implementing a second file system that is to send data requests towards the persistent page cache; and implementing a shim layer that is to intercept a data request sent to the first file system and communicate the data request to the second file system. In an embodiment, the request for data comprises a file descriptor. In an embodiment, the method further comprises sending a request to the storage device to copy the data to the persistent page cache upon a determination that the persistent page cache does not store a copy of the data. In an embodiment, the method further comprises translating a file descriptor and offset of the request for data into a logical block address and send the logical block address to the storage device in a request to the storage device. In an embodiment, the volatile page cache is to be stored in a volatile memory that is further to store application code and application data. In an embodiment, the persistent page cache is to be stored in 3D crosspoint memory. In an embodiment, the method further comprises determining whether to cache data in the volatile page cache or the persistent page cache based on at least one of a hint from an application that issues a system call referencing the data; whether the data is opened for writing; whether the data is required for booting; or whether the data is file data or metadata. In an embodiment, the method further comprises, upon receiving a request to sync dirty data of the persistent page cache, update metadata in the persistent page cache to mark the dirty data as persistent.

In at least one embodiment, a non-transitory machine readable storage medium includes instructions stored thereon, the instructions when executed by a processor to cause the processor to identify a request for data from an application; determine whether a persistent page cache stores a copy of the data, wherein the persistent page cache is directly addressable by the processor and is to cache data of a storage device that is not directly addressable by the processor; and access the data from the persistent page cache.

In an embodiment, the instructions when executed are to further cause the processor to identify a request for second data from a second application; determine, whether a volatile page cache stores a copy of the data, wherein the volatile page cache is directly addressable by the processor and is to cache data of the storage device; and access the data from the volatile page cache. In an embodiment, the instructions when executed are to further cause the processor to implement a volatile page cache manager that is to determine that a file that includes the data is marked for caching in the persistent page cache; and send a request for the data to a persistent page cache manager. In an embodiment, the instructions when executed are to further cause the processor to implement a first file system of an operating system, wherein the first file system is to determine whether a file that includes the data is marked for caching in the persistent page cache or volatile page cache; and in response to determining that the file is marked for caching in the persistent page cache, send a request for the data to a second file system. In an embodiment, the instructions when executed are to further cause the processor to implement a first file system that is to send data requests towards the volatile page cache; implement a second file system that is to send data requests towards the persistent page cache; and implement a shim layer that is to intercept a data request sent to the first file system and communicate the data request to the second file system.

In at least one embodiment, a computer system comprises a volatile memory to store a volatile page cache; a persistent memory to store a persistent page cache; and a processor to identify a request for data from an application; determine whether the persistent page cache stores a copy of the data, wherein the persistent page cache is directly addressable by the processor and is to cache data of a storage device that is not directly addressable by the processor; and access the data from the persistent page cache.

In an embodiment, the processor is to identify a request for second data from a second application; determine, whether the volatile page cache stores a copy of the data, wherein the volatile page cache is directly addressable by the processor and is to cache data of the storage device; and access the data from the volatile page cache. In an embodiment, the volatile page cache is to be stored in a volatile memory that is further to store application code and application data. In an embodiment, the computer system further comprises the storage device. In an embodiment, the computer system further comprises one or more of: a battery communicatively coupled to the processor, a display communicatively coupled to the processor, or a network interface communicatively coupled to the processor.

In at least one embodiment, a system comprises means to identify a request for data from an application; means to determine whether a persistent page cache stores a copy of the data, wherein the persistent page cache is directly addressable by the processor and is to cache data of a storage device that is not directly addressable by the processor; and means to access the data from the persistent page cache.

In an embodiment, the system further comprises means to identify a request for second data from a second application; means to determine, whether a volatile page cache stores a copy of the data, wherein the volatile page cache is directly addressable by the processor and is to cache data of the storage device; and means to access the data from the volatile page cache.

In an embodiment, the system further comprises means to implement a volatile page cache manager that is to determine that a file that includes the data is marked for caching in the persistent page cache; and means to send a request for the data to a persistent page cache manager. In an embodiment, the system further comprises means to implement a first file system of an operating system, wherein the first file system is to determine whether a file that includes the data is marked for caching in the persistent page cache or volatile page cache; and in response to determining that the file is marked for caching in the persistent page cache, send a request for the data to a second file system. In an embodiment, the system further comprises means to implement a first file system that is to send data requests towards the volatile page cache; means to implement a second file system that is to send data requests towards the persistent page cache; and means to implement a shim layer that is to intercept a data request sent to the first file system and communicate the data request to the second file system.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a processor comprising circuitry, the processor configured to:
implement a first file system that is to send first data requests towards a volatile page cache;
implement a second file system that is to send second data requests towards a persistent page cache;
identify a request for first data from an application;
determine whether the persistent page cache stores a copy of the first data, wherein the persistent page cache is directly addressable by the processor and is to cache second data of a storage device that is not directly addressable by the processor; and
access the first data from the persistent page cache.

2. The processor of claim 1, wherein the processor is to:
identify a request for third data from a second application;
determine whether the volatile page cache stores a copy of the third data, wherein the volatile page cache is directly addressable by the processor and is to cache fourth data of the storage device; and
access the third data from the volatile page cache.

3. The processor of claim 1, wherein the processor is to:
implement a volatile page cache manager that is to determine that a file that includes the first data is marked for caching in the persistent page cache; and
send a request for the first data to a persistent page cache manager.

4. The processor of claim 1, wherein the first file system is to:
determine whether a file that includes the first data is marked for caching in the persistent page cache or volatile page cache; and
in response to determining that the file is marked for caching in the persistent page cache, send a request for the first data to the second file system.

5. The processor of claim 1, wherein the processor is to:
implement a shim layer that is to intercept a data request sent to the first file system and communicate the data request to the second file system.

6. The processor of claim 1, wherein the processor is to determine whether to cache data in the volatile page cache or the persistent page cache based on at least one of:
a hint from an application that issues a system call referencing the data to be cached;
whether the data to be cached is opened for writing;
whether the data to be cached is required for booting; or
whether the data to be cached is file data or metadata.

7. The processor of claim 1, wherein the processor is to send a request to the storage device to copy the first data to the persistent page cache upon a determination that the persistent page cache does not store a copy of the first data.

8. The processor of claim 7, wherein the processor is to translate a file descriptor and offset of the request for data into a logical block address and send the logical block address to the storage device in the request to the storage device.

9. The processor of claim 1, wherein the volatile page cache is to be stored in a volatile memory that is further to store application code and application data.

10. The processor of claim 1, wherein the processor is to, upon receiving a request to sync dirty data of the persistent page cache, update metadata in the persistent page cache to mark the dirty data as persistent.

11. A non-transitory machine readable storage medium having instructions stored thereon, the instructions when executed by a processor to cause the processor to:
   implement a first file system that is to send data requests towards a volatile page cache;
   implement a second file system that is to send data requests towards a persistent page cache;
   identify a request for first data from an application;
   determine whether the persistent page cache stores a copy of the first data, wherein the persistent page cache is directly addressable by the processor and is to cache second data of a storage device that is not directly addressable by the processor; and
   access the first data from the persistent page cache.

12. The storage medium of claim 11, wherein the instructions when executed are to further cause the processor to:
   identify a request for third data from a second application;
   determine, whether the volatile page cache stores a copy of the third data, wherein the volatile page cache is directly addressable by the processor and is to cache fourth data of the storage device; and
   access the third data from the volatile page cache.

13. The storage medium of claim 11, wherein the instructions when executed are to further cause the processor to:
   implement a volatile page cache manager that is to determine that a file that includes the first data is marked for caching in the persistent page cache; and
   send a request for the first data to a persistent page cache manager.

14. The storage medium of claim 11, wherein the instructions when executed are to further cause the processor to implement the first file system of an operating system, wherein the first file system is to:
   determine whether a file that includes the first data is marked for caching in the persistent page cache or volatile page cache; and
   in response to determining that the file is marked for caching in the persistent page cache, send a request for the first data to the second file system.

15. The storage medium of claim 11, wherein the instructions when executed are to further cause the processor to:
   implement a shim layer that is to intercept a data request sent to the first file system and communicate the data request to the second file system.

16. A computer system comprising:
   a volatile memory to store a volatile page cache;
   a persistent memory to store a persistent page cache; and
   a processor configured to:
      implement a first file system that is to send first data requests towards the volatile page cache;
      implement a second file system that is to send second data requests towards the persistent page cache;
      identify a request for first data from an application;
      determine whether the persistent page cache stores a copy of the first data, wherein the persistent page cache is directly addressable by the processor and is to cache second data of a storage device that is not directly addressable by the processor; and
      access the first data from the persistent page cache.

17. The computer system of claim 16, wherein the processor is to:
   identify a request for third data from a second application;
   determine whether the volatile page cache stores a copy of the third data, wherein the volatile page cache is directly addressable by the processor and is to cache fourth data of the storage device; and
   access the third data from the volatile page cache.

18. The computer system of claim 16, wherein the volatile page cache is to be stored in a volatile memory that is further to store application code and application data.

19. The computer system of claim 16, further comprising the storage device.

20. The computer system of claim 16, further comprising one or more of: a battery communicatively coupled to the processor, a display communicatively coupled to the processor, or a network interface communicatively coupled to the processor.

\* \* \* \* \*